United States Patent
Smith

(10) Patent No.: US 9,641,806 B2
(45) Date of Patent: May 2, 2017

(54) AVERAGE SPEED DETECTION WITH FLASH ILLUMINATION

(71) Applicant: 3M INNOVATIVE PROPERTIES COMPANY, St. Paul, MN (US)

(72) Inventor: Brian Smith, West Sussex (GB)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 410 days.

(21) Appl. No.: 13/796,534

(22) Filed: Mar. 12, 2013

(65) Prior Publication Data

US 2014/0267725 A1    Sep. 18, 2014

(51) Int. Cl.
*H04N 7/18* (2006.01)
*G08G 1/054* (2006.01)
*G08G 1/017* (2006.01)

(52) U.S. Cl.
CPC .............. *H04N 7/18* (2013.01); *G08G 1/0175* (2013.01); *G08G 1/054* (2013.01)

(58) Field of Classification Search
USPC ........................................................ 348/148
See application file for complete search history.

(56) References Cited

U.S. PATENT DOCUMENTS

| | | | | |
|---|---|---|---|---|
| 5,809,161 A * | 9/1998 | Auty | ........................ | G01P 3/38 340/937 |
| 6,121,898 A | 9/2000 | Moetteli | | |
| 6,707,487 B1 * | 3/2004 | Aman | ................ | A63B 24/0003 348/169 |
| 8,294,595 B1 * | 10/2012 | Plotke | .................. | G08G 1/0175 340/441 |
| 8,331,621 B1 * | 12/2012 | Allen | ...................... | G08G 1/015 235/384 |
| 8,446,256 B2 | 5/2013 | Pinkham | | |
| 2007/0069921 A1 * | 3/2007 | Sefton | .................. | G08G 1/0175 340/932.2 |
| 2009/0284354 A1 | 11/2009 | Pinkham | | |

(Continued)

FOREIGN PATENT DOCUMENTS

EP        1 542 191        6/2005

OTHER PUBLICATIONS

International Search Report for International Publication No. PCT/US2014/018637, dated May 19, 2014.

*Primary Examiner* — Reza Aghevli

(57) ABSTRACT

An average speed detection system includes a first automatic license plate reader (ALPR) camera having an infrared camera for capturing identification information from a vehicle passing an entrance point. A first communication module is coupled to the first ALPR camera for transmitting the identification information and either an entrance timestamp or an exit timestamp for the vehicle. A second ALPR camera includes an infrared camera and an overview camera is coupled to a second communication module. The second communication module receives the vehicle identification information and the reference time stamp from the first communication module. The infrared camera of the second ALPR camera captures identification information from the vehicle as it passes the exit point, and if the time at which the vehicle passes an exit point is prior to an exit timestamp for the vehicle, the overview camera flash illuminates the vehicle and captures an image of the vehicle.

28 Claims, 3 Drawing Sheets

(56) References Cited

U.S. PATENT DOCUMENTS

| | | | |
|---|---|---|---|
| 2012/0010804 A1* | 1/2012 | Fliegen | G08G 1/04 |
| | | | 701/119 |
| 2012/0092189 A1 | 4/2012 | Jordan | |
| 2012/0162432 A1* | 6/2012 | Abl | G08G 1/054 |
| | | | 348/149 |
| 2012/0286558 A1 | 11/2012 | Berning et al. | |
| 2012/0286988 A1* | 11/2012 | Sepehri | G01S 13/589 |
| | | | 342/55 |

* cited by examiner

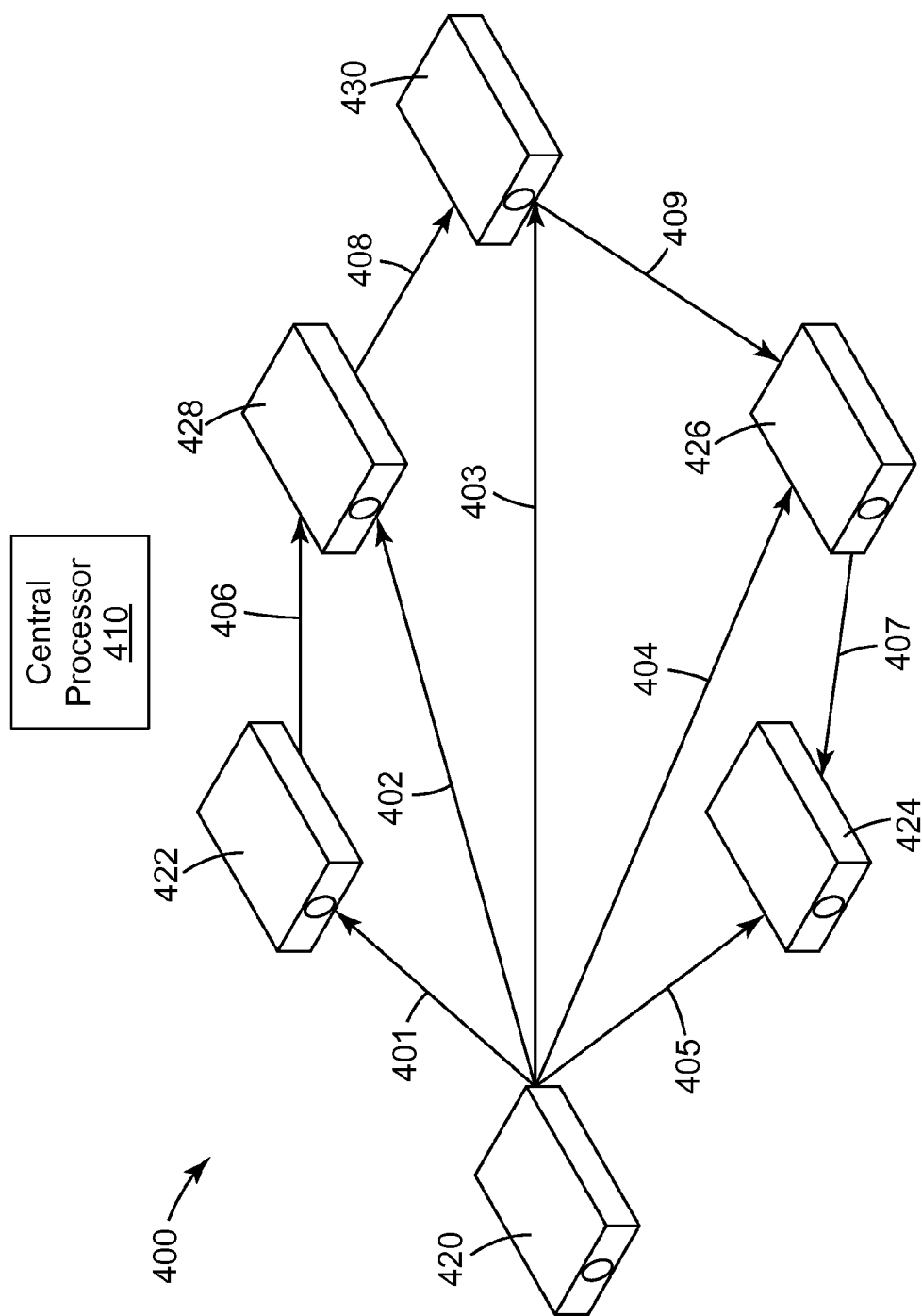

AVERAGE SPEED DETECTION WITH FLASH ILLUMINATION

TECHNICAL FIELD

The present invention relates to the field of average speed detection of moving vehicles. More specifically, the present invention relates to using automatic license plate recognition (ALPR) cameras for detecting average speed of moving vehicles and selectively providing flash based on the detected average speed.

BACKGROUND

Cameras, including automatic license plate recognition (ALPR) cameras, also known as automatic number plate recognition (ANPR) cameras, are commonly used in traffic applications. For example, such cameras can be used to detect vehicles that violate traffic signals or travel at a speed above a designated speed limit for a given road.

Average speed violations are often detected by a first camera capturing the time and license plate number of a vehicle. A second camera located a known distance from the first camera captures the time and license plate number of the vehicle as the vehicle passes the second camera. Each camera then sends the data to a back-end or remote server or processor. The remote processor can then identify which vehicles exceeded the speed limit on the area of road between the two cameras. Such a system is often referred to as an average speed detection system. U.S. patent application Ser. No. 12/146,716 to Fliegen describes such a system.

Many ALPR cameras include both infrared cameras and visible light cameras. Infrared cameras can be used to detect the number on the license plate, and visible light cameras can take photographs of the vehicle or driver to use as evidence of the violation. Illumination of the area is often used to improve image quality of the visible light camera, especially in the hours of darkness.

In other speed detection methods, specifically a point speed detection method using a radar or laser to detect speed, Xenon or light emitting diode (LED) flash illumination is a well known technique for generating good lighting conditions for capturing photographs of a passing vehicle.

Improvements to average speed detection systems would be welcomed.

SUMMARY

The present invention includes several embodiments, described below. In one instance the present invention includes an average speed detection camera system. The system includes a first automatic license plate reader (ALPR) camera having an infrared camera for capturing identification information from a vehicle passing an entrance point. A first communication module is coupled to the first ALPR camera for transmitting the identification information and either an entrance timestamp or exit timestamp for the vehicle. A second ALPR camera includes an infrared camera and an overview camera is coupled to a second communication module. The second communication module receives the vehicle identification information and the transmitted time stamp from the first communication module. The infrared camera of the second ALPR camera captures identification information from the vehicle as it passes an exit point, and if the time at which the vehicle passes an exit point is prior to the exit timestamp for the vehicle, the overview camera flash illuminates the vehicle with visible light and captures an image of the vehicle.

In another instance, the present invention includes a method of detecting average speed of a vehicle. The method includes capturing identification information for the vehicle with an infrared camera of a first automatic license plate reader (ALPR) camera as the vehicle passes an entrance point. The method further includes transmitting the identification information with either an entrance timestamp or exit timestamp for the vehicle to a second communication module coupled to a second ALPR camera, the second ALPR camera including an infrared camera and an overview camera. The method further includes capturing the vehicle identification information with the infrared camera of the second ALPR camera as the vehicle passes an exit point. The method further includes determining whether the time at which the vehicle passes the exit point is prior to the exit timestamp for the vehicle; and if the time at which the vehicle passes the exit point is prior to the exit timestamp for the vehicle, flash illuminating the vehicle with visible light and capturing an image of the vehicle with the overview camera.

In another embodiment, the present invention includes an average speed detection system. The system include a first vehicle identification device for capturing identification information from a vehicle passing an entrance point and a first communication module coupled to the first vehicle identification device for transmitting the identification information and either an entrance timestamp or an exit timestamp for the vehicle. The system further includes a second vehicle identification device comprising an overview camera, the second vehicle identification device coupled to a second communication module, wherein the second communication module receives the vehicle identification information and the exit time stamp from the first communication module. The vehicle identification device captures identification information from the vehicle as it passes an exit point, and if the time at which the vehicle passes an exit point is prior to the exit timestamp for the vehicle, the overview camera flash illuminates the vehicle with visible light and captures an image of the vehicle.

The present invention provides several advantages over current average speed detection systems. For example, the present invention reduces light pollution by only providing flash illumination when a vehicle violates a speed limit. Further, the selective flash illumination provides better quality images and blur reduction when compared to constant illumination of an area. Selective flash illumination provided by an ANPR camera allows an efficient system without need for additional cameras taking photographs downstream after a violation has been calculated by as central processor, such as described by U.S. patent application Ser. No. 12/146,716 to Fliegen. The present system further increases driver privacy by only taking photographs of violating vehicles, and not storing photographs of other vehicles or drivers at remote locations.

BRIEF DESCRIPTION OF DRAWINGS

The following figures provide illustrations of the present invention. They are intended to further describe and clarify the invention, but not to limit scope of the invention.

FIG. 4 is a diagram of a network of cameras used in an average speed detection system.

Like numbers are generally used to refer to like components. The drawings are not to scale and are for illustrative purposes only.

DETAILED DESCRIPTION

Figure 1:
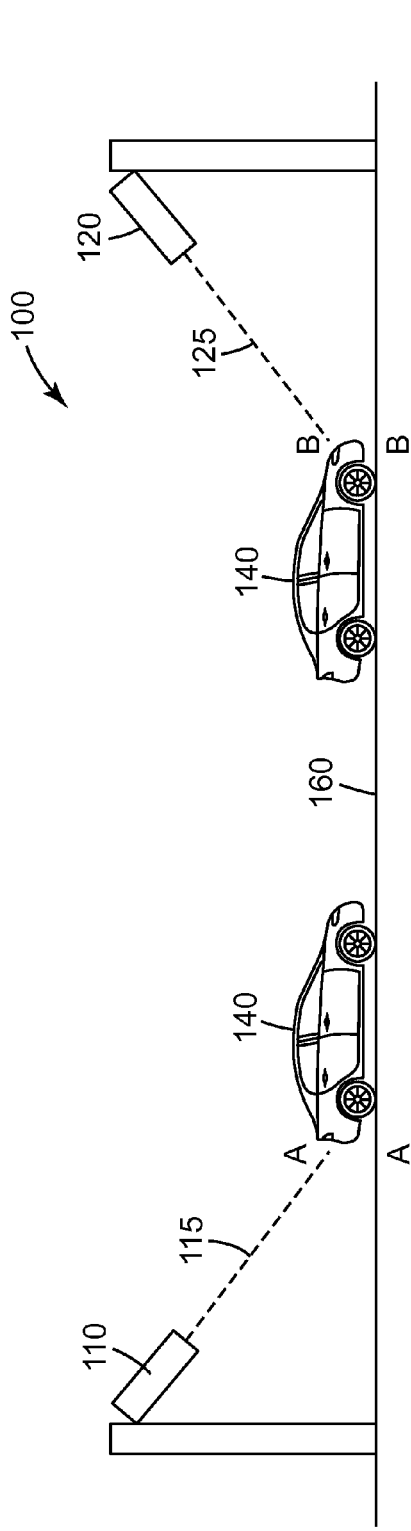
FIG. 1 is an average speed detection system with two cameras.

FIG. 1 is a side view of an average speed detection system 100. System 100 includes at least two cameras, as shown in FIG. 1, but may include more cameras, to form a network of cameras, as discussed elsewhere. In some configurations, other identification devices, such as a radio frequency identification (RFID) reader may be used in the place of the cameras to detect the identification of passing vehicles.

Cameras 110 and 120 are disposed along road 160. The distance between points A and B along road 160 is known and can be determined at the time the cameras are installed. Point A is approximately the last point at which the first ALPR camera 110 can capture identification information from the vehicle 140, and point B is approximately the first point at which the second ALPR camera 120 can capture identification information from vehicle 140. Lines 115 and 125 represent the line of sight of cameras 110 and 120, respectively, between the cameras 110, 120 and the back or front license plate of vehicle 140.

After camera 110 captures the identification information from vehicle 140 passing entrance point A, typically by use of an infrared camera that is part of camera 120, a first communication module coupled to camera 110 transmits the identification information and either an entrance timestamp or an exit timestamp for the vehicle to a second communication module coupled to camera 120. The vehicle identification information may be a barcode, the license plate number, or other identifying information, such as an identification number read from an RFID tag attached to the vehicle. An entrance timestamp is the time at which the entrance camera captures the identification information from the passing vehicle, in other words, the time at which the vehicle passes point A. An exit timestamp is the entrance timestamp increased by the minimum travel time, which is the minimum time for a legal journey between an entrance point A and an exit B. A speed violation is detected if the time at which the vehicle is identified by the exit camera is prior to the exit timestamp.

The second camera 120 includes an infrared camera and an overview camera. A communication module coupled to camera 120 receives the vehicle identification information and transmitted timestamp from the communication module coupled to camera 110. The infrared camera of camera 120 captures identification information from vehicle 140 as the vehicle passes exit point B. If the local time at camera 120 at which the vehicle 140 passes exit point B is prior to the exit timestamp for the vehicle, the overview camera flash from camera 120 illuminates vehicle 140 with visible light and captures an image of vehicle 140. If vehicle 140 passes exit point B at a time after the exit timestamp, vehicle 140 has traveled between entrance point A and exit point B at a speed within the speed limit for road 160, so camera 120 does not capture an image or photograph of vehicle 140.

The communication module associated with camera 110 transmits either the entrance timestamp or exit timestamp for the vehicle to the communication module coupled to camera 120. In the instance that the communication module transmits the exit timestamp, camera 110 calculates the exit timestamp by increasing the entrance timestamp by the minimum travel time between the entrance point and exit point associated with the entrance and exit cameras. In the instance the entrance timestamp is transmitted to an exit camera, or camera 120, the camera 120 can then calculate the exit timestamp by the same calculation.

As will be appreciated by one of skill in the art upon reading the present disclosure, camera 110 and camera 120 and associated communication modules may be in communication by a variety of means, including wireless communication through a network, using preferably the TCP/IP protocol, or the UDP or other protocol. Further, it will also be appreciated that camera 110 and 120 and associated communication module clocks may be synchronized by means of GPS time receivers or other recognized standards.

The system of FIG. 1 may have a variety of configurations. For example, both cameras 110 and 120 may include both infrared and overview cameras. One or both overview cameras may be a color camera or a black and white camera. In some configurations, cameras 110 and 120 may both take photographs of the vehicle, license plate, or driver, and may selectively forward the images to a central system if the vehicle is detected to have violated the applicable speed limit.

Communication modules coupled to cameras 110 and 120 may be separate devices in electrical communication with cameras 110 and 120 or may be integrated components of cameras 110 and 120.

Flash illumination consistent with the present system may last for a very short period of time. For example, the flash illumination may run for as little as a single video field or for several video fields depending on the amount of evidence preferred, and generally for less than one second.

Figure 2:
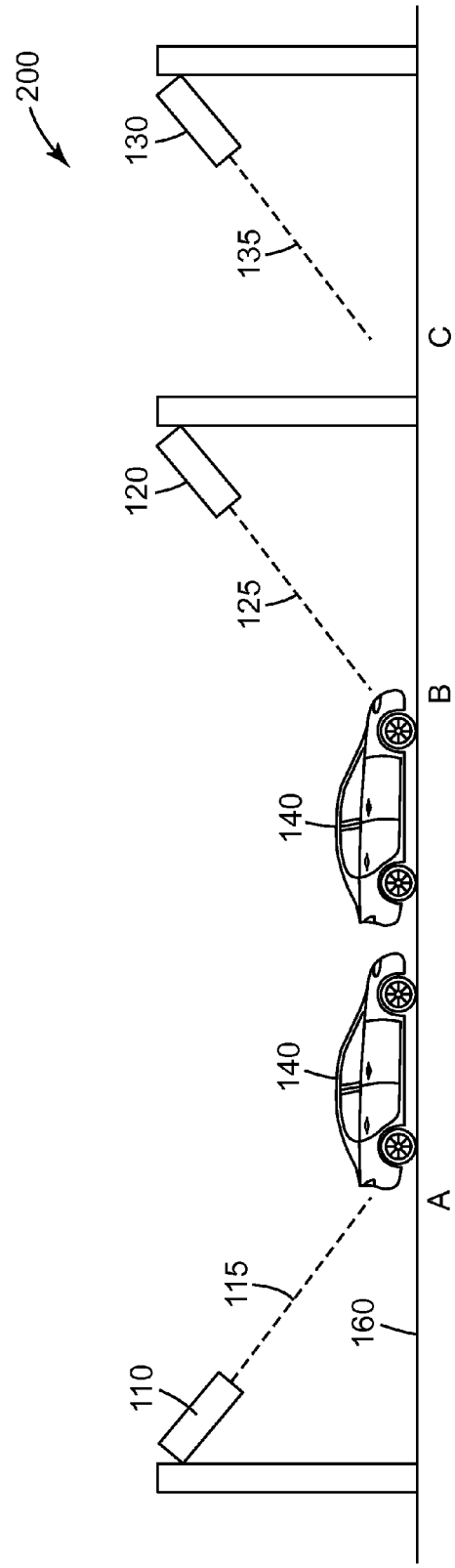
FIG. 2 is an average speed detection system with three cameras.

FIG. 2 is an average speed detection system with three cameras according to the present disclosure. As also shown in FIG. 1, FIG. 2 has road 160 with cameras 110 and 120 disposed at two locations along the road to read identification information from vehicle 140. FIG. 2 further includes camera 130 disposed to read identification information from a vehicle passing point C on road 160. Like cameras 110 and 120, camera 130 may also be an ALPR camera and include an infrared and an overview camera.

According to the system shown in FIG. 2, camera 110 or the associated communication module further transmits vehicle identification information and either an entrance timestamp or exit timestamp for vehicle 140 to both of the communication modules associated with cameras 120 and 130. In the instance that an exit timestamp is transmitted, the respective exit timestamps transmitted to communication modules associated with cameras 120 and 130 are different from each other, based on the different minimum travel times calculated based on the distance between entrance point A and exit points B and C respectively, and the legal speed for the area of road between the entrance and exit points. In the instance that the communication module associated with camera 110 transmits an entrance timestamp, cameras 120 and 130 calculate respective exit timestamps.

In FIG. 2, point B may also be an entrance point, and accordingly, camera 120 or the associated communication module may transmit either an entrance timestamp or an exit timestamp to camera 130 or the associated camera module. This concept may be extrapolated further. Each of cameras 110, 120 and 130 may be part of a network of a plurality of ALPR cameras, wherein each ALPR camera in the network may be associated with both an entrance point and an exit point.

In both of FIG. 1 and FIG. 2, each of the cameras may be in communication with a central processor. A central processor may interact with the cameras in a variety of ways. For example, a central processor may be used to generate minimum travel times for calculating exit timestamps based on distances between the entrance points or cameras and respective exit points or cameras and the speed limits for the area between the entrance and exit points. In an alternate configuration, minimum travel times may also be generated locally by entering speed and distance information into the local camera.

A camera network consistent with the present invention, whether including two cameras or more, maybe controlled by a central processor. In such a situation, the processor is capable of dynamically changing calculations associated with exit timestamps and the network topology between the plurality of ALPR cameras.

Figure 3:
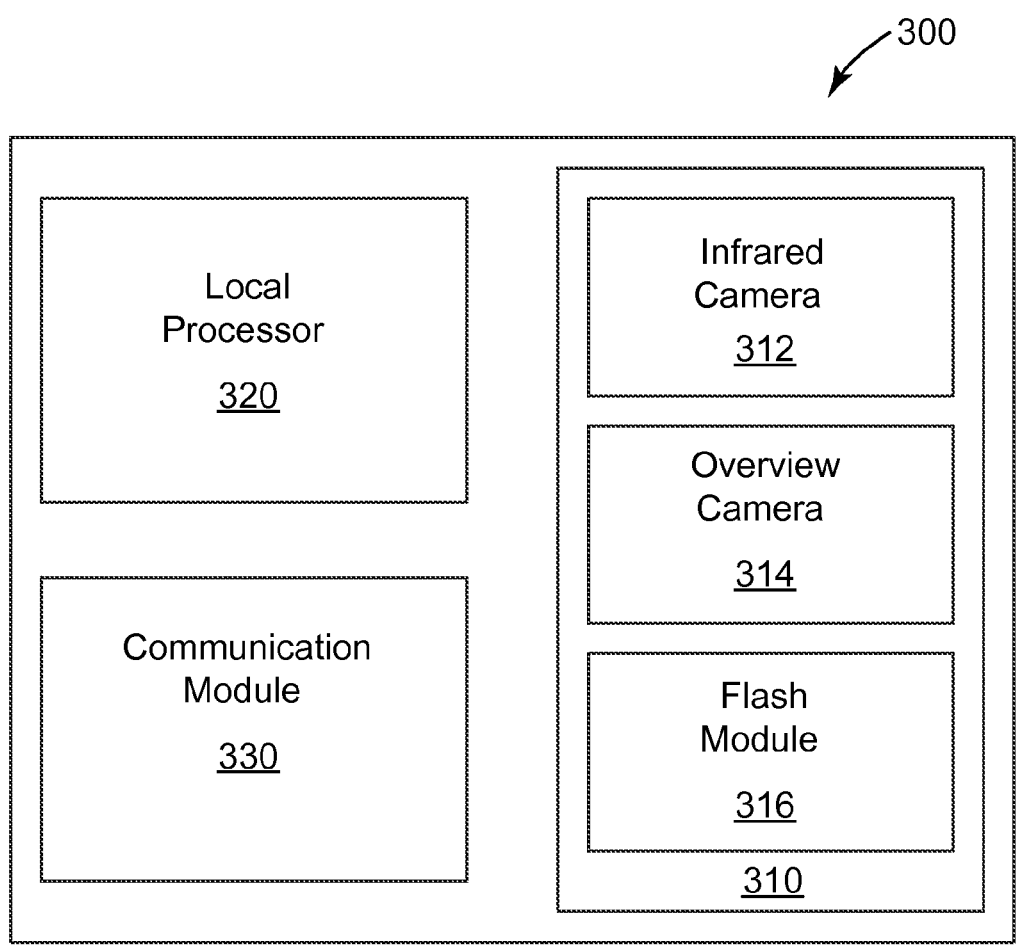
FIG. 3 is a block diagram of an exemplary camera for use in an average speed detection system, including a communication module.

FIG. 3 is a block diagram of an exemplary camera 300 for use in an average speed detection system, including a communication module 330. Camera 300 may include camera module 310, including infrared camera 312, overview camera 314 and flash module 316. When a camera is disposed only at an entrance point, camera module 310 may not include overview camera 314 and flash module 316 to reduce camera cost.

Camera 300 includes local processor 320. Local processor 320 controls camera module 310 and interfaces with communication module 330. Local processor 320 may also store data related to received vehicle identification information, reference or exit timestamps, and compare the exit timestamp to the local time to determine whether a speed violation has occurred.

Communication module 330 may be an integrated component of camera 300, or may be a separate device electrically coupled to camera 300. Communication module includes communication capabilities to receive information from a central processor or other camera communication modules via a variety of wireless and wired communication methods using preferably the TCP/IP protocol or the UDP or other protocol.

FIG. 4 is a diagram of a network 400 of cameras used in an average speed detection system. Each camera 420-430 may be in communication with central processor 410. Cameras 420-430 may be associated either with only an entrance point, only an exit point, or both an entrance and exit point. Cameras 420-430 may form a dynamic network of cameras to monitor an area for speed violations. While arrows 401-409 show connections between cameras 420-430 in the network 400, with ends near cameras serving as an entrance point and tips, these connections may be dynamically controlled and changed by central processor 410.

When a speed violation between any entrance point and exit point is detected, central processor may passively receive identification and time data from the communication module associated with the camera near the exit point, along with images or photos identifying the vehicle. In another configuration, the processor may selectively pull that information and data from the applicable camera. In some configurations, the communication module coupled to an exit camera may send a message to the communication module coupled to an entrance camera instructing the entrance camera to send evidence of a violation to a central processor. Such evidence may include vehicle identification information, an entrance timestamp, an overview photograph of the vehicle, or other desired information as requested or required by law enforcement.

A network of cameras consistent with the present invention may be an infinite network of processors. In addition to collecting data associated with particular violations, central processor 410 may track data for particular vehicles that have repeat violations, may compare data between vehicles, may track data associated with violations in a particular area and may perform various data analyses to assess risk of particular areas, traffic congestion problems or otherwise monitor particular areas along a road.

While the present application describes a variety of particular configurations, other configurations and combinations of configurations will be apparent to an individual of ordinary skill in the art upon reading the present application, and are intended to be within the scope of the following claims.

What is claimed is:

1. An average speed detection camera system comprising:
a first automatic license plate reader (ALPR) camera having an infrared camera for capturing vehicle identification information from a vehicle passing an entrance point;
a first communication module coupled to the first ALPR camera for transmitting the vehicle identification information and either an entrance timestamp or an exit timestamp for the vehicle;
a second ALPR camera including an infrared camera and an overview camera which reside in a single unit, the second ALPR camera coupled to a second communication module, wherein the second communication module receives the vehicle identification information and transmitted time stamp from the first communication module; and
wherein the infrared camera of the second ALPR camera captures identification information from the vehicle as it passes an exit point irrespective of whether the time at which the vehicle passes the exit point is prior to the exit timestamp for the vehicle, and only if the time at which the vehicle passes an exit point is prior to the exit timestamp for the vehicle and the vehicle identification information received at the second communication module matches the identification information captured by the second ALPR camera, the overview camera flash illuminates the vehicle with visible light and the overview camera captures an image of the vehicle.

2. The system of claim 1, wherein exit timestamp is the entrance timestamp increased by a minimum travel time between the first ALPR camera and the second ALPR camera.

3. The system of claim 2, wherein the minimum travel time is the minimum time for a legal journey between an entrance and exit pair of cameras.

4. The system of claim 1, wherein the first ALPR camera calculates the exit timestamp for the vehicle and the first communication module transmits the exit timestamp for the vehicle to the second communication module.

5. The system of claim 1, wherein the first communication module transmits the entrance timestamp to the second communication module, and wherein the second ALPR camera calculates the exit timestamp for the vehicle.

6. The system of claim 1, wherein the entrance point is the last point at which the first ALPR camera can capture identification information from the vehicle, and wherein the exit point is the first point at which the second ALPR camera can capture identification information from the vehicle.

7. The system of claim 1, further comprising a third ALPR camera, wherein the communication module associated with the first ALPR camera further transmits the vehicle identification information and an exit timestamp for the vehicle to the third ALPR camera, and wherein the exit timestamp transmitted to the third ALPR camera is different from the exit timestamp transmitted to the second ALPR camera.

8. The system of claim 1, wherein the first ALPR camera and second ALPR camera are part of a network of a plurality of ALPR cameras, wherein each ALPR camera in the network may be associated with both an entrance point and an exit point.

9. The system of claim 8, wherein the network is controlled by a central processor, and wherein the processor is capable of dynamically changing calculations associated with exit timestamps and the network topology between the plurality of ALPR cameras.

10. The system of claim 1, wherein the overview camera of the second ALPR camera is a color camera.

11. The system of claim 1, wherein the communication module coupled to the second ALPR camera sends a message to the communication module coupled to the first ALPR camera instructing the first ALPR camera to send evidence of a violation to a central processor.

12. The system of claim 1, wherein the first ALPR camera further comprises an overview camera.

13. The system of claim 1, wherein the first communication module is an integrated component of the first ALPR camera.

14. The system of claim 1, wherein the first communication module communicates with the second communication by means of a TCP/IP network.

15. The system of claim 1, wherein the vehicle identification information is at least one of a license plate number or a barcode.

16. The system of claim 1, wherein the flash illumination runs for less than one second.

17. A method of detecting average speed of a vehicle comprising:
capturing identification information for the vehicle with an infrared camera of a first automatic license plate reader (ALPR) camera as the vehicle passes an entrance point;
transmitting the identification information with either an entrance timestamp or an exit timestamp for the vehicle to a second communication module coupled to a second ALPR camera, the second ALPR camera including an infrared camera and an overview camera which reside in a single unit;
capturing the vehicle identification information with the infrared camera of the second ALPR camera as the vehicle passes an exit point irrespective of whether the time at which the vehicle passes the exit point is prior to the exit timestamp for the vehicle;
determining whether the time at which the vehicle passes the exit point is prior to the exit timestamp for the vehicle; and
only if the time at which the vehicle passes the exit point is prior to the exit timestamp for the vehicle and the vehicle identification information received at the second communication module matches the identification information captured by the second ALPR camera, flash illuminating the vehicle with visible light and capturing an image of the vehicle with the overview camera.

18. The method of claim 17, wherein the exit timestamp is the entrance timestamp increased by a minimum travel time between the first ALPR camera and the second ALPR camera.

19. The method of claim 18, wherein the minimum travel time is the minimum time for a legal journey between an entrance and exit pair of cameras.

20. The method of claim 17, wherein the first ALPR camera calculates the exit timestamp for the vehicle and the first communication module transmits the exit timestamp for the vehicle to the second communication module.

21. The method of claim 17, wherein the first communication module transmits the entrance timestamp to the second communication module, and wherein the second ALPR camera calculates the exit timestamp for the vehicle.

22. The method of claim 17, wherein the entrance point is the last point at which the first ALPR camera can capture identification information from the vehicle, and wherein the exit point is the first point at which the second ALPR camera can capture identification information from the vehicle.

23. The method of claim 17, wherein the overview camera of the second ALPR camera is a color camera.

24. The method of claim 17, further comprising the second communication module transmitting the image of the vehicle captured by the overview camera to a central processor.

25. The method of claim 17, wherein the first communication module communicates with the second communication by means of a TCP/IP network.

26. The method of claim 17, wherein the vehicle identification information is at least one of a license plate number or a barcode.

27. The method of claim 17, wherein the flash illumination runs for less than one second.

28. An average speed detection system comprising:
a first vehicle identification device for capturing identification information from a vehicle passing an entrance point;
a first communication module coupled to the first vehicle identification device for transmitting the identification information and an associated exit timestamp for the vehicle;
a second vehicle identification device comprising an overview camera which resides in a single unit with the second vehicle identification device, the second vehicle identification device coupled to a second communication module, wherein the second communication module receives the vehicle identification information and the exit time stamp from the first communication module; and
wherein the second vehicle identification device captures identification information from the vehicle as it passes an exit point irrespective of whether the time at which the vehicle passes the exit point is prior to the exit timestamp for the vehicle, and only if the time at which the vehicle passes an exit point is prior to the exit timestamp for the vehicle and the vehicle identification information received at the second communication module matches the identification information captured by the second ALPR camera, the overview camera flash illuminates the vehicle with visible light and the overview camera captures an image of the vehicle.

* * * * *